(12) United States Patent
Ender

(10) Patent No.: US 11,130,184 B2
(45) Date of Patent: Sep. 28, 2021

(54) TABLE SAW AND SPLINTER PROTECTION ELEMENT

(71) Applicant: FESTOOL GMBH, Wendlingen (DE)

(72) Inventor: Dominic Richard Ender, Nürtingen (DE)

(73) Assignee: FESTOOL GMBH, Wendlingen (DE)

( * ) Notice: Subject to any disclaimer, the term of this patent is extended or adjusted under 35 U.S.C. 154(b) by 0 days.

(21) Appl. No.: 16/339,641

(22) PCT Filed: Sep. 28, 2017

(86) PCT No.: PCT/EP2017/074623
§ 371 (c)(1),
(2) Date: Apr. 4, 2019

(87) PCT Pub. No.: WO2018/065291
PCT Pub. Date: Apr. 12, 2018

(65) Prior Publication Data
US 2019/0232400 A1 Aug. 1, 2019

(30) Foreign Application Priority Data

Oct. 5, 2016 (DE) ...................... 10 2016 219 255.8

(51) Int. Cl.
*B23D 47/02* (2006.01)
*B27G 19/10* (2006.01)
(Continued)

(52) U.S. Cl.
CPC ........... *B23D 47/025* (2013.01); *B23D 45/06* (2013.01); *B23D 47/045* (2013.01); *B27G 19/10* (2013.01)

(58) Field of Classification Search
CPC ..... B23D 47/045; B23D 47/025; B27G 19/10
(Continued)

(56) References Cited

U.S. PATENT DOCUMENTS 1,590,974 A 6/1926 Hall
2,345,273 A * 3/1944 Macklanburg ........ E06B 7/2312
49/444
(Continued)

FOREIGN PATENT DOCUMENTS

AT 409467 B 8/2002
DE 1983783 U 4/1968
(Continued)

OTHER PUBLICATIONS

International Search Report issued in International Application No. PCT/EP2017/074623 with English translation dated Jan. 5, 2018 (7 pages).
(Continued)

*Primary Examiner* — Kenneth E Peterson
(74) *Attorney, Agent, or Firm* — Flynn Thiel, P.C.

(57) ABSTRACT

A table saw, preferably a circular table saw, with a support structure which can be placed on a support and on the upper side of which a workpiece support plate is provided, and with a saw blade projecting upwards over the workpiece support plate. The workpiece support plate is mounted so that it can slide in the sawing direction relative to the support structure and to the saw blade and has a splinter protection element arranged on a side of the workpiece support plate facing the saw blade. This side is guided past the saw blade when the workpiece support plate is moved.

7 Claims, 4 Drawing Sheets

Figure 1:
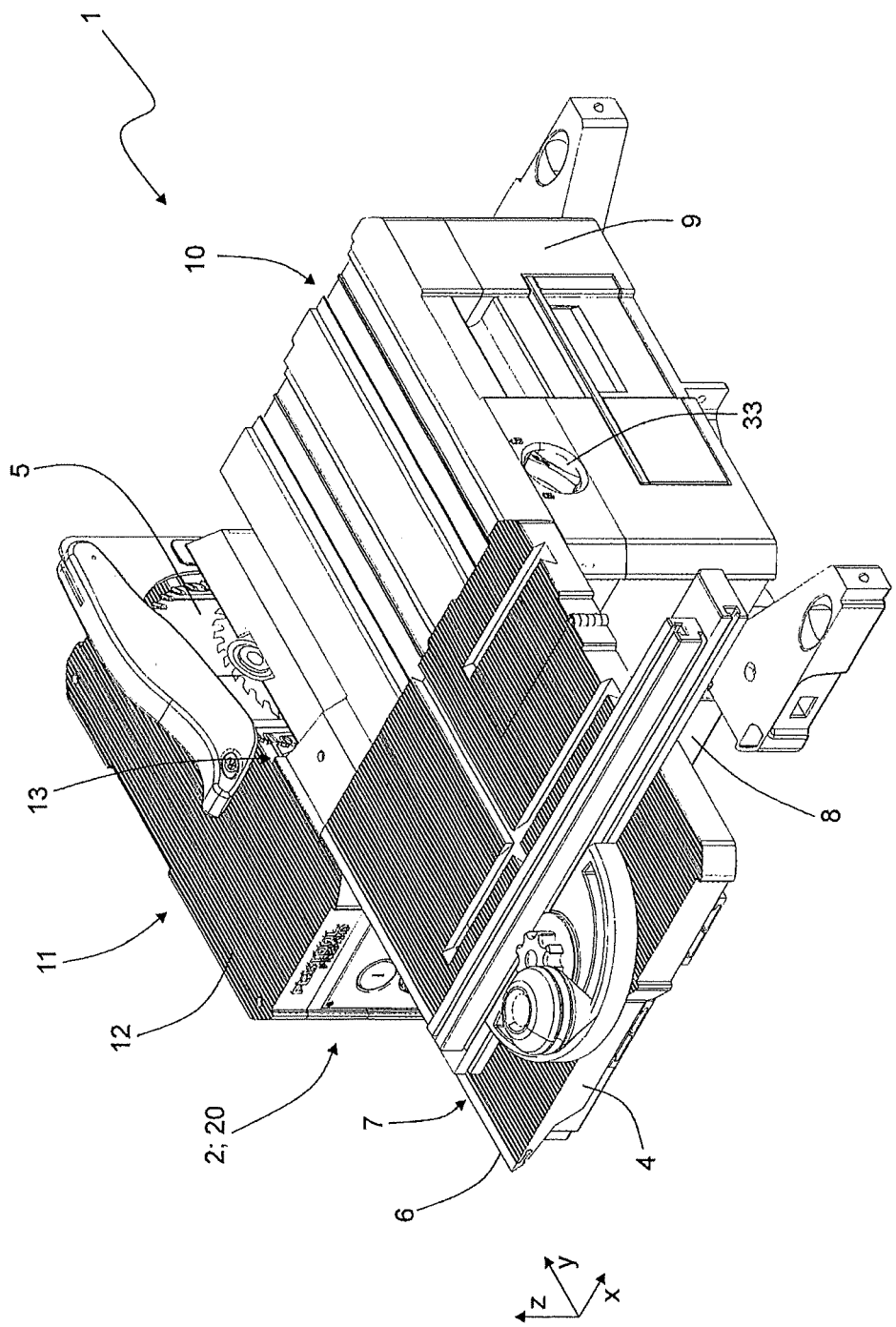

(51) Int. Cl.
  *B23D 47/04* (2006.01)
  *B23D 45/06* (2006.01)
(58) Field of Classification Search
  USPC .......................................................... 83/477.2
  See application file for complete search history.

(56) References Cited

U.S. PATENT DOCUMENTS

| | | | | |
|---|---|---|---|---|
| 2,854,043 | A * | 9/1958 | Raymond | B27B 9/02 30/376 |
| 2,996,089 | A * | 8/1961 | McCarty | B23D 51/02 30/374 |
| 3,041,681 | A * | 7/1962 | Goodwin | E06B 7/2301 49/480.1 |
| 3,079,653 | A * | 3/1963 | Cornell | E06B 7/231 49/493.1 |
| 3,276,167 | A * | 10/1966 | Hirche | E04B 1/6812 49/489.1 |
| 3,692,317 | A | 9/1972 | Augustin | |
| 4,059,038 | A * | 11/1977 | Rietema | B23Q 9/0014 83/745 |
| 4,539,881 | A * | 9/1985 | Maier | B23Q 9/005 30/374 |
| 4,614,062 | A * | 9/1986 | Sperr | E06B 3/26303 49/401 |
| 4,974,306 | A * | 12/1990 | Cole | B27B 5/222 29/434 |
| 5,112,065 | A * | 5/1992 | Meyer | E06B 7/2305 220/240 |
| 5,540,129 | A * | 7/1996 | Kalber | B23D 47/005 83/447 |
| 5,584,143 | A * | 12/1996 | Kennedy | A47F 3/043 49/501 |
| 5,918,520 | A * | 7/1999 | Whitcomb | B23D 47/025 83/435.11 |
| 6,260,305 | B1 * | 7/2001 | Joyce | E06B 5/01 49/489.1 |
| 8,096,219 | B2 * | 1/2012 | Potter | B26D 7/025 83/409 |
| 2003/0233926 | A1 | 12/2003 | Makropoulos | |

FOREIGN PATENT DOCUMENTS

| | | | |
|---|---|---|---|
| DE | 1948499 | A1 | 4/1971 |
| DE | 3718232 | A1 | 9/1988 |
| DE | 9103077.3 | U1 | 7/1991 |
| DE | 4200713 | A1 | 7/1993 |
| DE | 29809921 | U1 | 11/1998 |
| DE | 202004009123 | U1 | 10/2004 |
| EP | 1457299 | A1 | 9/2004 |
| EP | 2484473 | A1 | 8/2012 |
| SU | 1206083 | A1 * | 1/1986 ........... B23D 47/025 |

OTHER PUBLICATIONS

Written Opinion of International Searching Authority issued in International Application No. PCT/EP2017/074623 dated Jan. 5, 2018 (5 pages).
Search Report of German Patent Office issued in German Application No. 10 2016 219 255.8 dated May 12, 2017 (10 pages).

* cited by examiner

TABLE SAW AND SPLINTER PROTECTION ELEMENT

The invention relates to a table saw, preferably a circular table saw, with a support structure which can be placed on a support and on the upper side of which a workpiece support plate is provided, and with a saw blade projecting upwards over the workpiece support plate.

A circular table saw is known from the publication DE 20 2004 00912 3 U 1, which comprises a worktop with a supporting surface, a housing which supports the worktop, and a machine frame for accommodating a motor and a saw blade which is arranged below and connected to the worktop.

One object of the invention is to modify a table saw of the type mentioned above in such a way that, using a simple table saw design, the risk of damage to the surface of a workpiece during handling and machining of the workpiece can be reduced.

The object is achieved by the features specified in the characterising part of claim 1. According to the invention, the workpiece support plate is mounted so that it can slide in the sawing direction relative to the support structure and to the saw blade and has a splinter protection element arranged on one side of the workpiece support plate facing the saw blade, which side is guided past the saw blade when the workpiece support plate is slid.

The workpiece support plate is mounted in a sliding manner relative to the saw blade. This enables a workpiece placed on the workpiece support plate to be fed to the saw blade and/or pushed into the saw blade by moving the workpiece support plate. This prevents the workpiece from having to be slid over the workpiece support plate, reducing the risk of surface damage, such as scratches, to the side of the workpiece resting on the workpiece support plate.

In addition, the splinter protection element provided on the workpiece support plate reduces the risk of damage to the workpiece due to tearing during sawing. Since the splinter protection element is located on the sliding workpiece support plate and is therefore carried along with the sliding workpiece support plate, it can be ensured that splinter protection is provided between the workpiece support plate and the saw blade even in different positions of the workpiece support plate.

The fact that the splinter protection element is provided directly on the slidable workpiece support plate results in a simple construction of the table saw. In particular, this measure eliminates the need to provide, between the saw blade and the workpiece support plate, a dedicated mounting structure for the splinter protection element, which mounting structure is fixed to the support structure. Consequently, the advantage of a simple assembly is achieved by attaching the splinter protection element to the slidable workpiece support plate.

Advantageous further developments of the invention are the subject matter of the dependent claims.

The splinter protection element preferably comprises a splinter protection lip, in particular a splinter protection rubber lip. The splinter protection lip is elongated and/or strip-shaped. A splinter protection element designed in this way can ensure that sawing is as tear-free as possible.

In a preferred embodiment, the splinter protection element extends in front of the saw blade, expediently in such a way that, when the table saw is put into operation, by moving the workpiece support plate, the splinter protection element is cut to size by the saw blade. This design of the splinter protection element ensures that the splinter protection element can be precisely cut to size, so that it lies later in operation exactly against the saw blade and thus allows tear-free sawing of the workpiece.

In the preferred embodiment, the splinter protection element is detachably attached to the workpiece support plate. In particular, the splinter protection element is attached to the workpiece support plate in such a way that it can be removed from the workpiece support plate manually, preferably without loosening a screw or other fastening element. The splinter protection element and the workpiece support plate are designed in such a way that the splinter protection element can be reversibly attached to and/or removed from the workpiece support plate. Due to this design, the splinter protection element can be replaced very easily.

A groove is expediently provided on the side of the workpiece support plate facing the saw blade to accommodate a section of the splinter protection element. It is expedient for the groove to exit at a front and/or rear side of the workpiece support plate. The splinter protection element can thus be easily pulled out of the groove and is therefore particularly easy to remove from the workpiece support plate.

According to a preferred embodiment, the splinter protection element is elongated. Expediently, the splinter protection element extends over the entire side of the workpiece support plate facing the saw blade. In particular, the length and arrangement of the splinter protection element are selected such that in each position of the workpiece support plate, in which the workpiece support plate is located in the region of the saw blade and sawing of a workpiece placed on the workpiece support plate is possible, a section of the splinter protection element is located between the workpiece support plate and the saw blade, so that tear-free sawing of the workpiece can also take place in different positions of the workpiece support plate.

The splinter protection element preferably has an arrow-shaped profile. The arrow-shaped profile expediently has an arrowhead section and a shaft section. The shaft section is located in particular in the groove provided on the workpiece support plate. The arrowhead section is preferably located outside the groove and forms a splinter protection lip.

A preferably circularly formed engagement structure which is thickened in relation to the shaft section is expediently provided at a distal end of the shaft section.

The engagement structure is expediently in engagement with a complementary engagement structure of the workpiece support plate or the groove and prevents the splinter protection element from being removed from the workpiece support plate transversely to the sawing direction by form locking. This design ensures that the splinter protection element is sufficiently fixed in the groove during operation of the table saw and can still be removed relatively easily from the workpiece support plate if, for example, it is necessary to replace the splinter protection element.

According to another advantageous embodiment, the table saw has coupling means. The coupling means are preferably suitable for providing, in a state in which the table saw together with at least one box-shaped body forms a vertical stack, a releasable vertically tension-proof coupling with the at least one box-shaped body. Using the coupling means, the table saw can be stably placed in a vertical stack and transported in it. This improves the manageability and portability of the table saw. The above-mentioned mounting of the splinter protection element directly on the sliding workpiece support plate is particularly advantageous in this context, as it enables a simple and thus as compact as possible design of the table saw as mentioned above. Expediently, the outer shape of the table saw corresponds to the shape of a system casing, so that the table saw can be accommodated in a stack of system casings.

According to the invention, a splinter protection element is provided for a table saw of the type described above. The splinter protection element is designed in particular as a splinter protection element of the table saw described above and can therefore serve as a replacement for such a splinter protection element. Expediently, the splinter protection element comprises an elongated body with an arrow-shaped profile having an arrowhead section and a shaft section. A preferably circular engagement structure, in particular thickened in relation to the shaft section, is expediently provided at a distal end of the shaft section.

Figure 2:
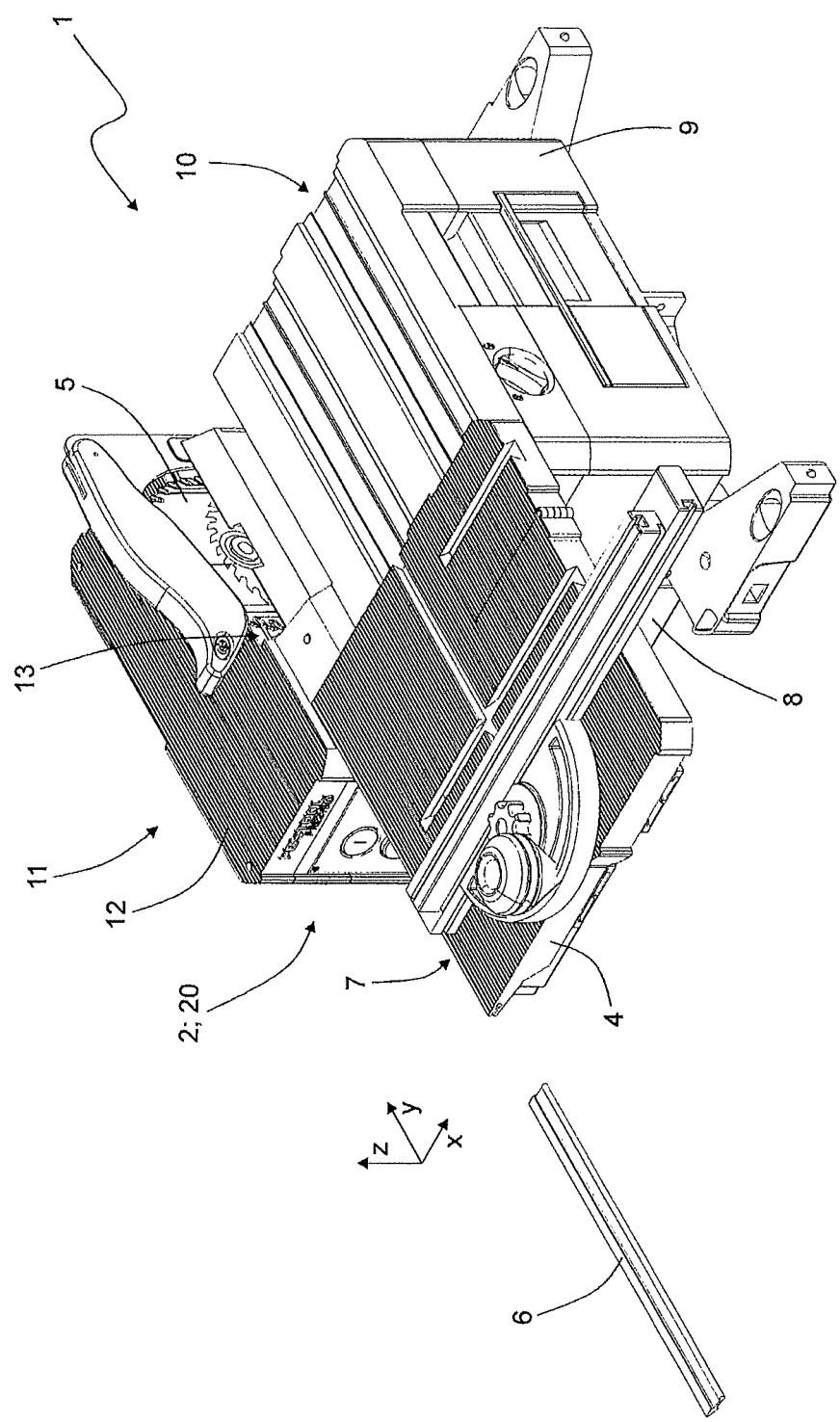
Figure 3:
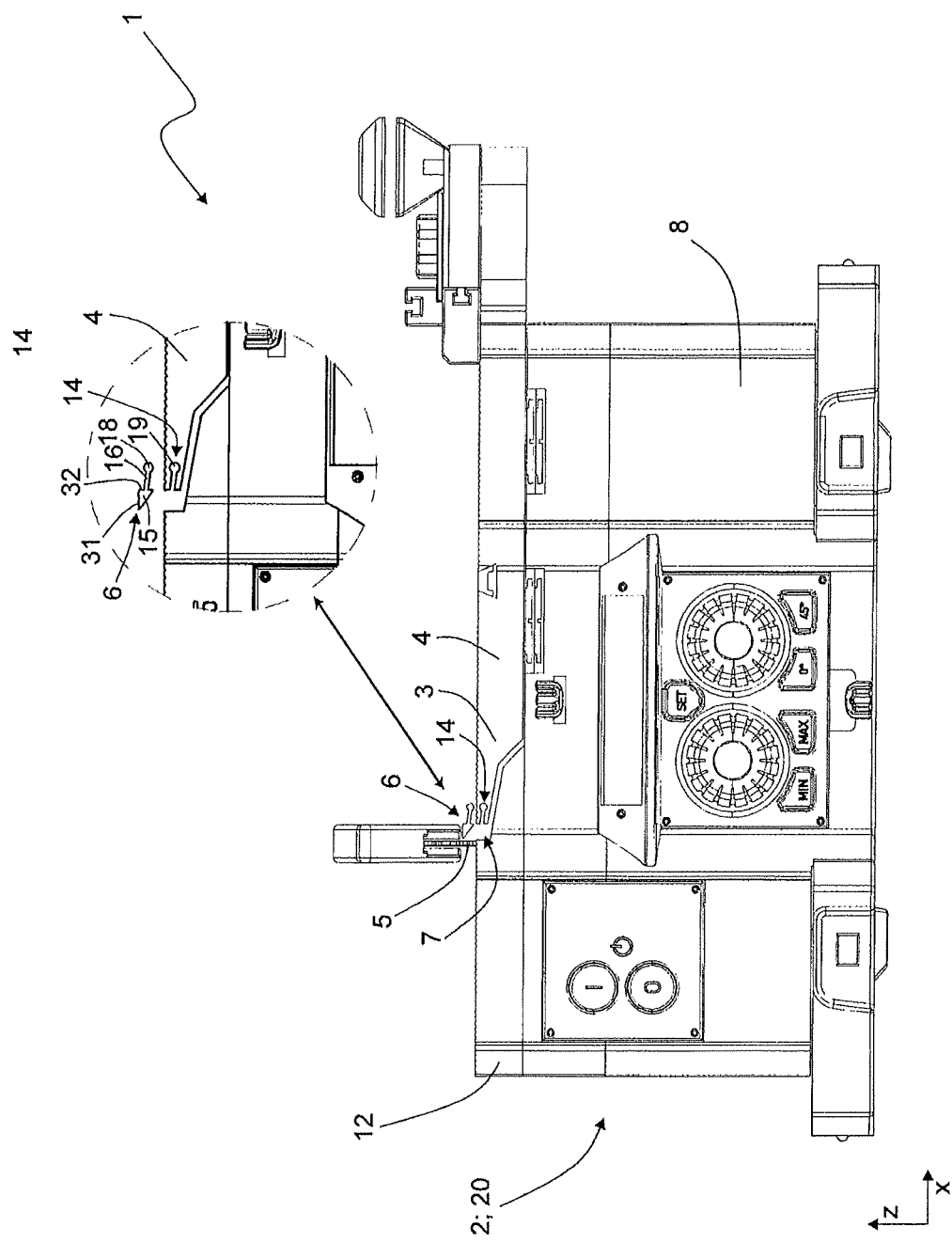
Figure 4:
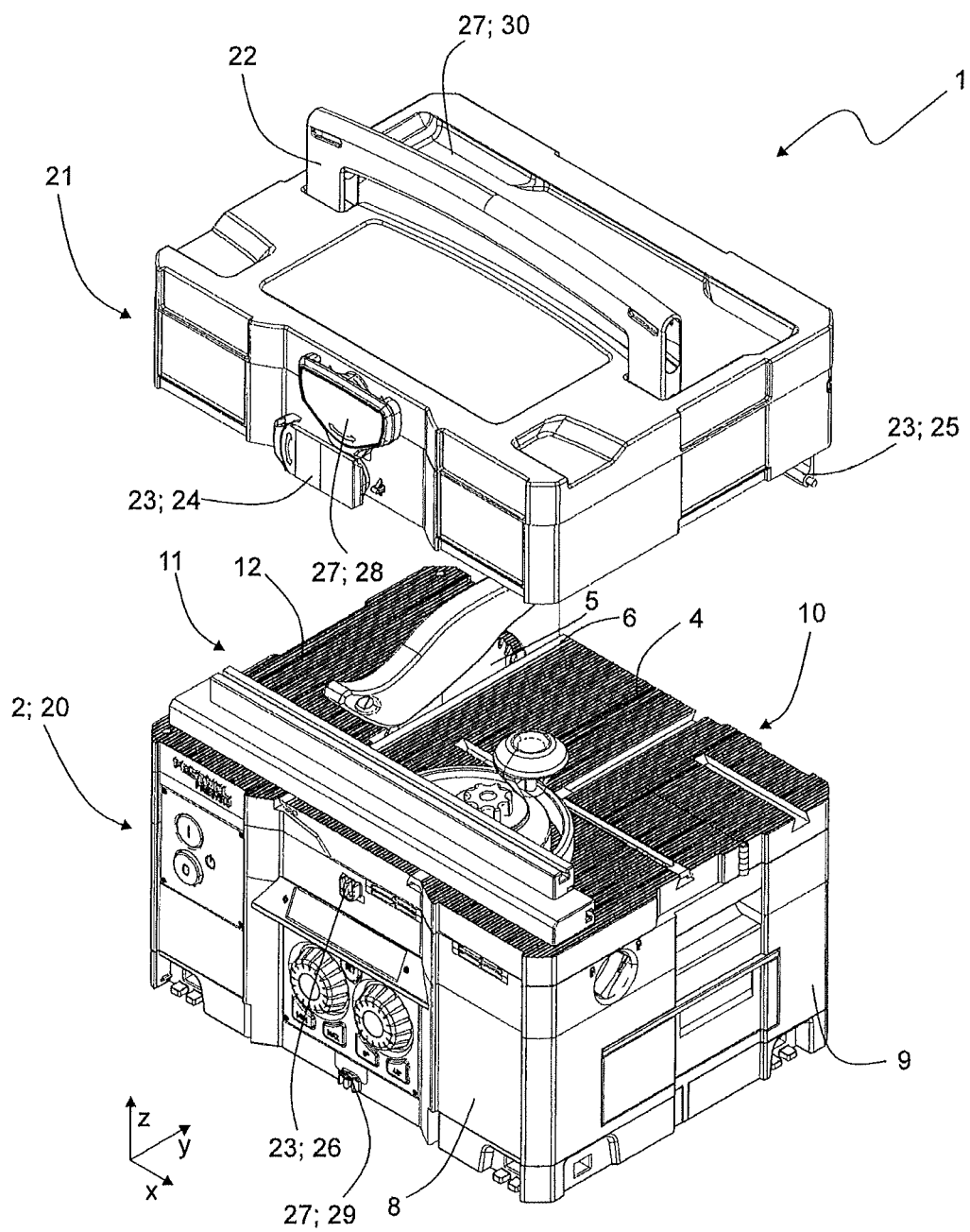

An exemplary embodiment of a table saw is described below with reference to the figures. Wherein:

FIG. 1 shows a perspective view of a circular table saw with pulled out workpiece support plate and inserted splinter protection element, FIG. 2 shows a perspective view of a circular table saw with pulled out workpiece support plate and the detached splinter protection element, FIG. 3 shows a front view of a circular table saw and the detached splinter protection element, FIG. 4 shows a perspective view of a circular table saw with upper part FIG. 1 shows an exemplary embodiment of a table saw 1. The table saw 1 is exemplarily designed as a circular table saw, but can alternatively also be designed as a different table saw, for example as a table jigsaw.

The table saw 1 extends in a vertical direction parallel to the z-axis drawn in the figures, in a longitudinal direction parallel to the x-axis drawn in the figures and in a transverse direction parallel to the y-axis drawn in the figures. The x-axis, y-axis and z-axis are orthogonal to each other.

The table saw 1 has a support structure 2 that can be placed on a support. A workpiece support plate 4 is provided on the upper side of support structure 2. The table saw 1 also has a saw blade 5 which projects upwards over the workpiece support plate 4. The workpiece support plate 4 is mounted so that it can be slid in one sawing direction y relative to the support structure 2 and to the saw blade 5. The workpiece support plate 4 has a splinter protection element 6. The splinter protection element 6 is arranged on a side 7 of the workpiece support plate 4 facing the saw blade. The side 7 of the workpiece support plate 4 is moved past the saw blade 5 when the workpiece support plate 4 is moved.

This design of the table saw 1 achieves the above-mentioned object in that with a simple construction of the table saw the risk of damage to the surface of a workpiece during handling and machining of the workpiece can be reduced.

Exemplary details of the table saw 1 are explained in more detail below.

As shown in FIG. 1, the support structure 2 is box-shaped. The support structure 2 has four circumferential walls 8, 9, 10, 11 which are aligned orthogonally to each other and which are substantially closed. The two circumferential walls 8 and 10 lie in parallel x-z planes and the two circumferential walls 9 and 11 lie in parallel y-z planes. It should be noted that the support structure 2 can also be designed differently; for example, the support structure 2 can also be designed as a leg frame.

The workpiece support plate 4 is provided on the upper side of the support structure 2. The workpiece support plate 4 has a rectangular support surface which faces upwards when the table saw 1 is in the operating position. The workpiece support plate 4 is located in an x-y plane and is mounted on the support structure 2 so that the workpiece support plate 4 can be slid relative to the support structure 2 and relative to the saw blade 5 in the sawing direction y and the y direction respectively.

The workpiece support plate 4 can be moved into various positions in the y-direction relative to the support structure 2. FIGS. 1 and 2 show the workpiece support plate 4 in an pulled out position. In the pulled out position, a large part of the workpiece support plate 4 is expediently located outside a horizontal outer contour of the box-shaped support structure 2. Conversely, FIG. 4 shows the workpiece support plate 4 in a transport position. In the transport position, the workpiece support plate 4 is arranged in alignment with the horizontal outer contour of the support structure 2, so that the workpiece support plate 4 and the support structure 2 together form a box-shaped or cuboid-shaped body, which is hereinafter also referred to as the lower part 20.

The workpiece support plate 4 can be fixed relative to the saw blade 5 or support structure 2 by means of a locking device (not shown). The fixing can be adjusted, for example, by means of a rotary knob 33 provided on the circumferential wall 9. In particular, the workpiece support plate 4 can be fixed in a position in which it is aligned with the support structure 2.

The saw blade 5 is provided on the upper side of the support structure 2. The saw blade 5 reaches through an opening provided in the support structure 2 and projects upwards past the workpiece support plate 4. The saw blade 5 lies on an imaginary line aligned in the y-direction which divides the upper side of the support structure 2 in the x-direction into two x-areas. The sliding workpiece support plate 4 is provided in one x-area. In the other x-area, a support plate 12 is provided, which is preferably fixed to the support structure 2. The sliding workpiece support plate 4 and the support plate 12 preferably occupy the same z-area so that they lie in the same x-z plane. In the transport position of the workpiece support plate 4, the workpiece support plate 4 and the support plate 12 together form a body which has an essentially rectangular horizontal outer contour.

The saw blade 5 is preferably arranged eccentrically in the x-direction with respect to the upper side of the support structure 2, so that the workpiece support plate 4 is longer in the x-direction than the support plate 12. For example, the workpiece support plate 4 can be about twice as long in the x-direction as the support plate 12.

In the example shown, the upper sides or contact surfaces of the workpiece support plate 4 and the support plate 12 are provided with grooves. Alternatively, the upper side of the workpiece support plate 4 and/or the support plate 12 can also be provided without grooves or even or with a different structure.

With respect to the y-direction, the saw blade 5 is arranged in a rear area of the support structure 2. In this area, the support plate 12 has a rectangular recess 13 extending in the y-direction. According to an embodiment not shown in the figures, a splinter protection element, for example a splinter protection rubber lip, may be provided on the support plate 12, in particular in the recess 13, and in particular in the y-area in which the saw blade 5 or the cutting area of the saw blade 5 is located.

The table saw 1 comprises a drive unit not shown in the figures, for example an electric motor and possibly corresponding control electronics, for the mechanical drive of the saw blade 5. Exemplarily, the drive unit is completely arranged in the support structure 2 and fastened thereto ready for operation, so that the drive unit remains in the support structure 2 during the machining of the workpiece by the saw blade 5 driven by the drive unit.

The splinter protection element 6 is detachably attached to the workpiece support plate 4. FIGS. 1 and 4 show the splinter protection element 6 in a state attached to the workpiece support plate 4, while FIGS. 2 and 3 show the splinter protection element 6 in a state detached from the workpiece support plate 4.

In FIG. 2, the splinter protection element 6 is detached from the workpiece support plate 4. As shown in FIG. 2, the splinter protection element has a splinter protection lip that extends in the y-direction. The splinter protection element 6 is elongated or rod-shaped, in particular strip-shaped. The splinter protection element is made of rubber or another flexible material, for example.

In the exemplary embodiment shown, the splinter protection element 6 extends over the entire side 7 of the workpiece support plate 4 facing the saw blade 5. In particular, the splinter protection element extends over the entire width of the support structure 2 or the table saw 1. Alternatively to the embodiment shown, the splinter protection element 6 can also be designed in such a way that it does not extend over the entire side 7 of the workpiece support plate 4. In this case it is advantageous if the splinter protection element 6 extends at least over the y-area of the workpiece support plate 4, which y-area can be positioned in the cutting area of the saw blade 5.

FIG. 3 shows a front view of the table saw 1. FIG. 3 also shows a detailed view of the side 7 of the workpiece support plate 4 facing the saw blade 5.

As shown in FIG. 3, a groove 14 is provided on the side 7 of the workpiece support plate 4 facing the saw blade 5 to accommodate the splinter protection element 6. The side 7 is e.g. a vertical side surface of the workpiece support plate 4. The profile of the groove 14 extends accordingly horizontally or in the x-direction into the workpiece support plate 4. The groove 14 is complementary to a section of the splinter protection element 6 so that it can accommodate this section. The groove 14 runs exemplarily over the entire width of the workpiece support plate 4; alternatively, the groove 14 can also run over only part of the width of the workpiece support plate 4. In the example shown, the groove 14 ends at a front side and a rear side of the workpiece support plate 4.

As also shown in FIG. 3, the splinter protection element 6 has an arrow-shaped profile. The profile has an arrowhead section 15 and an associated shaft section 16. The arrowhead section 15 tapers in the x-direction towards the saw blade 5. The arrowhead section is designed in such a way that an upper side surface 31 of the arrowhead section 15 is arranged substantially flush with the support surface of the workpiece support plate 4 when the splinter protection element 6 is inserted. The upper side surface 31 lies in the same x-z plane as the support surface of the workpiece support plate 4. The arrowhead section 15 has a triangular profile, wherein the upper side surface 31 is approximately orthogonal to a side face 32 facing the shaft section 16.

At the distal end of the shaft section 16 facing away from the arrowhead section 15, an exemplary circular or cylindrical engagement structure 18 is provided. The engagement structure 18 is thickened compared to the shaft section 16. The shaft section 16 is complementary to the groove 14 so that it can be accommodated in this groove. The arrowhead section 15 is located outside the groove 14 and forms a splinter protection lip.

The groove 14 is complementary to the shaft section 16. In particular, the groove 14 has an engagement structure 19 complementary to the engagement structure 18 which, in a state in which the splinter protection element 6 is attached to the workpiece support plate 4, engages the engagement structure 18.

In the example shown in FIG. 3, the splinter protection element 6 is dimensioned so that it does not extend in front of the saw blade 5; i.e. it does not occupy the same x-area as the saw blade 5. Alternatively, the splinter protection element 6 can also be designed in such a way that it extends up to the saw blade 5; i.e. it occupies the same x-area as the saw blade. If the splinter protection element 6 is dimensioned in the latter way, it can be pushed into the saw blade 5 by moving the workpiece support plate 4 when the table saw 5 is put into operation. In this way, the splinter protection element can be precisely cut to size.

FIG. 3 also shows that the workpiece support plate 4 has a plate section 3 in the x-direction which tapers towards the saw blade 5. At the distal end of this plate section 3 there is the aforementioned side 7 or the vertical side surface on which the groove 14 is provided. In the example shown, the plate section 3 tapers in such a way that the z-dimension of the side 7 essentially corresponds to the maximum z-dimension of the splinter protection element 6. The part of the support surface of the workpiece support plate 4 associated with plate section 3 lies in the same x-y plane as the rest of the support surface of the workpiece support plate 4.

FIG. 4 shows the table saw 1 in a configuration in which the table saw 1 has an upper part 21 in addition to the lower part 20. The upper part 21 is hood-shaped and has a carrying handle 22, which is arranged exemplarily on the upper side of the upper part 21. The upper part 21 can be placed on the lower part 20 and can be detachably coupled in a vertical tension-proof manner to the lower part 20. For this purpose, the upper part 21 and the lower part 20 have corresponding coupling means 23, such as a rotary latch 24, lugs 25, a recess (not shown) for the lugs 25 as well as a locking anchor contour 26. In a state in which the upper part 21 is placed on the lower part 20, the table saw 1 has an essentially box-shaped or cuboid-shaped basic shape. The outer shape of the table saw 1 then corresponds to that of a system casing.

The table saw 1 has further coupling means 27 adapted to provide, in a state in which the table saw 1 together with at least one box-shaped body not shown in the figures forms a vertical stack, a releasable vertically tension-proof coupling with the at least one box-shaped body.

The basic shape of the table saw 1 is defined in particular by the box-shaped support structure 2 and the upper part 21. Preferably, the outer surfaces of the support structure 2 and the upper part 21 represent the housing or the outer housing surfaces of the table saw 1. The housing or the basic shape of the table saw 1 has the shape of a system casing. System casings of a system have a base area defined in the system and have coupling means defined in the system so that system casings of a system can be assembled into a stable stack. System casings are widely used, for example, as modular tool boxes for storing hand-held power tools, accessories and/or consumables. If the basic shape or housing of the table saw is in the form of a system casing, the transportable machining unit can be conveniently stowed and transported in a stack of system casings.

The coupling means 27 comprise in particular upper coupling means provided on the upper part 21. The upper coupling means are adapted to provide a releasable, vertical tension-proof coupling to the box body in a state in which a box-shaped body, such as another table saw 1, is stacked on the table saw 1. The upper coupling means comprise a movable locking element 28. In the example shown, the locking element 28 is a rotary latch rotatably mounted on the upper part 21. The rotary latch is arranged on the front wall of upper part 21. The axis of rotation of the rotary latch is orthogonal to the front wall.

Expediently, the coupling means 27 further comprise lower coupling means provided on the lower part 20. The lower coupling means are adapted to provide a releasable vertical tension-proof coupling to the box body in a state in which the table saw 1 is stacked on a box body such as another table saw 1. The lower coupling means comprise at least one locking anchor contour 29 arranged non-movably at the lower part 20. The locking anchor contour 29 is located on the front circumferential wall 8 of the lower part 20. The locking anchor contour 29 is designed as a locking projection and protrudes from the circumferential wall 8.

The locking element 28 and the locking anchor contour 29 are arranged and designed in such a way that with two table saws 1 stacked vertically one above the other, the locking element 28 of one table saw 1 can be brought into coupling engagement with the locking anchor contour 29 of the other table saw 1.

Coupling means 27 may also include engagement structures provided on the underside and upper side of the table saw 1. For example, the table saw 1 may have one or more engagement recesses 30 on the upper side of the upper part 21 and one or more engagement projections corresponding to the engagement recesses on the underside of the lower part 3 not shown in the figures. The engagement structures can be designed in such a way that they contribute to vertical tension-proof coupling.

The invention claimed is:

1. A table saw with a support structure for placement on a support and on the upper side of which a workpiece support plate is provided, and with a saw blade which projects upwards over the workpiece support plate, wherein the workpiece support plate is mounted in a sliding manner relative to the support structure and to the saw blade in the sawing direction and in that it has a splinter protection element which is arranged on a side of the workpiece support plate facing the saw blade and which is guided past the saw blade when the workpiece support plate is slid, wherein a groove is provided on the side of the workpiece support plate facing the saw blade, which groove receives a portion of the splinter protection element, wherein the splinter protection element has an arrow-shaped profile with an arrowhead section and a shaft section, wherein the shaft section is accommodated in the groove provided on the workpiece support plate and the arrowhead section is located outside the groove and forms a splinter protection lip, wherein the arrowhead section has a triangular profile, and wherein an upper side surface of the arrowhead section is flush with a support surface of the workpiece support plate.

2. The table saw according to claim 1, wherein an engagement structure thickened relative to the shaft section is provided at a distal end of the shaft section.

3. The table saw according to claim 2, wherein the engagement structure is in engagement with a complementary engagement structure of the workpiece support plate and prevents the splinter protection element from being removed from the workpiece support plate transversely to the sawing direction by positive locking.

4. The table saw according to claim 1, wherein the splinter protection element extends in front of the saw blade so that the splinter protection element can be cut to size from the saw blade by displacing the workpiece support plate when the table saw is put into operation.

5. The table saw according to claim 1, wherein the splinter protection element is detachably attached to the workpiece support plate.

6. The table saw according to claim 1, wherein the groove opens out at a front and/or rear side of the workpiece support plate.

7. The table saw according to claim 1, wherein the splinter protection element is elongated and extends over the entire side of the workpiece support plate facing the saw blade.

* * * * *